United States Patent [19]
Yamamoto et al.

[11] Patent Number: 5,798,826
[45] Date of Patent: Aug. 25, 1998

[54] OPTICAL DISPLACEMENT SENSOR

[75] Inventors: Eiji Yamamoto, Ome; Masataka Ito, Hachioji, both of Japan

[73] Assignee: Olympus Optical Co., Ltd., Tokyo, Japan

[21] Appl. No.: 821,773

[22] Filed: Mar. 20, 1997

[30] Foreign Application Priority Data

Mar. 28, 1996 [JP] Japan .................. 8-074189

[51] Int. Cl.⁶ .................. G01C 3/08; G01B 11/02
[52] U.S. Cl. .................. 356/4.09; 356/358
[58] Field of Search .................. 356/4.09, 358, 356/383, 373

[56] References Cited

U.S. PATENT DOCUMENTS

| | | | |
|---|---|---|---|
| 4,806,778 | 2/1989 | Yamamoto et al. | 250/561 |
| 5,267,016 | 11/1993 | Meinzer et al. | 356/358 |

FOREIGN PATENT DOCUMENTS

| | | |
|---|---|---|
| 4-242989 | 8/1992 | Japan . |
| 7-55423 | 3/1995 | Japan . |

OTHER PUBLICATIONS

K. Choquette et al; "Polarization Modulation of Cruciform Vertical–Cavity Laser Diodes"; May 23, 1994; pp. 2767–2769; Appl. Phys. Lett. 64 (21).

K. Choquette et al; "Transverse-mode Engineering in Vertical Cavity–Surface Emitting Lasers"; pp. 148–149; Cleo '93/ Tuesday Afternoon.

*Primary Examiner*—Mark Hellner
*Attorney, Agent, or Firm*—Frishauf, Holtz, Goodman, Langer & Chick

[57] ABSTRACT

A optical displacement sensor comprises optical output detecting unit for detecting an optical output from the semiconductor laser, which changes in accordance with the phase of return light reflected by the external reflection unit, when an optical distance between the semiconductor laser and the external reflection unit changes at a change rate, optical distance modulation unit for changing the optical distance at predetermined periods by an amount of modulation of the optical distance at a rate higher than the change rate, and a detection circuit system for detecting the amount and direction of change of the optical distance based on an optical output from the optical output detecting unit detected in synchronism with a timing of modulating the optical distance by the optical distance modulation unit.

8 Claims, 11 Drawing Sheets

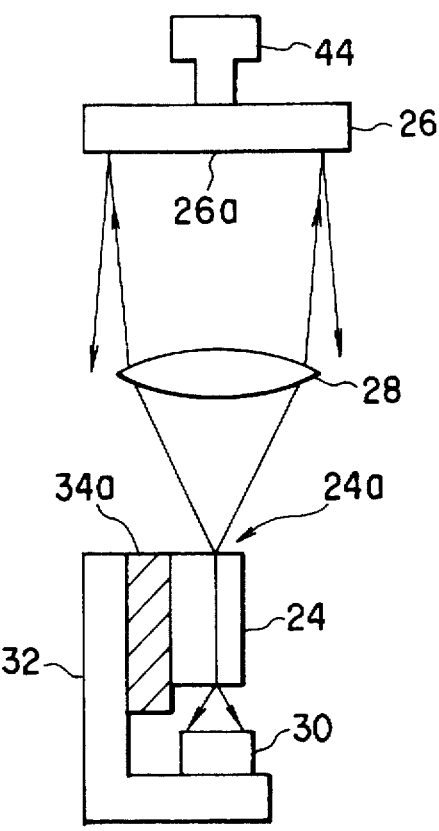
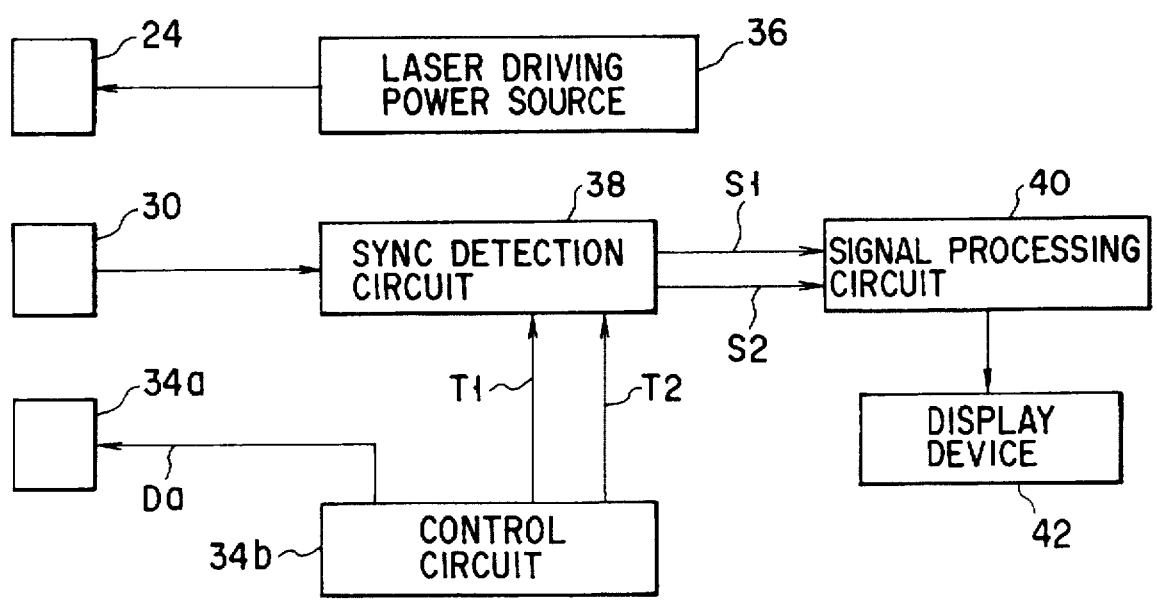
FIG. 1A
FIG. 1B

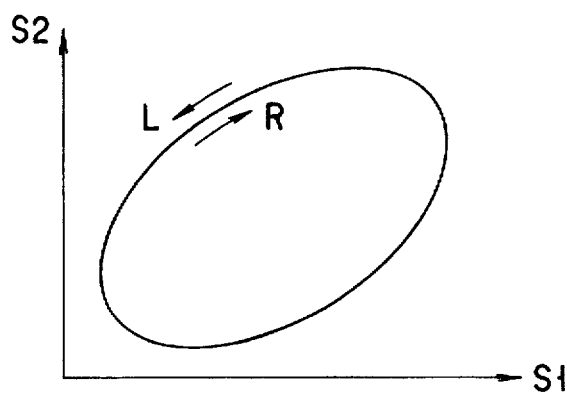
F I G. 4
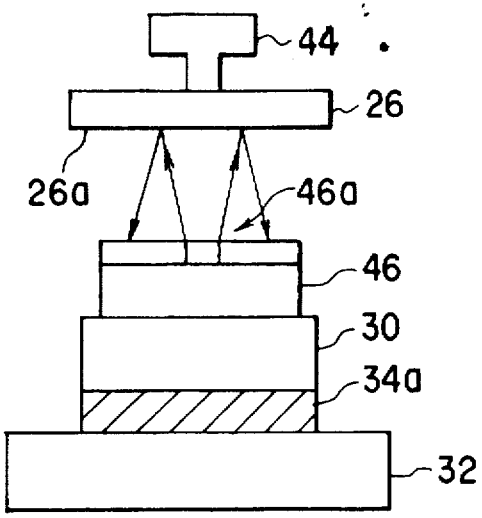
F I G. 5
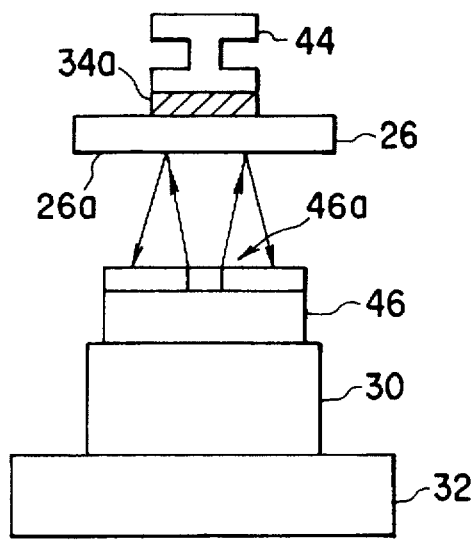
F I G. 6
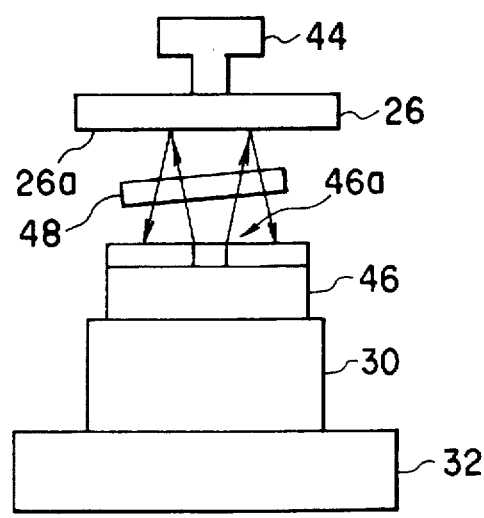
F I G. 7

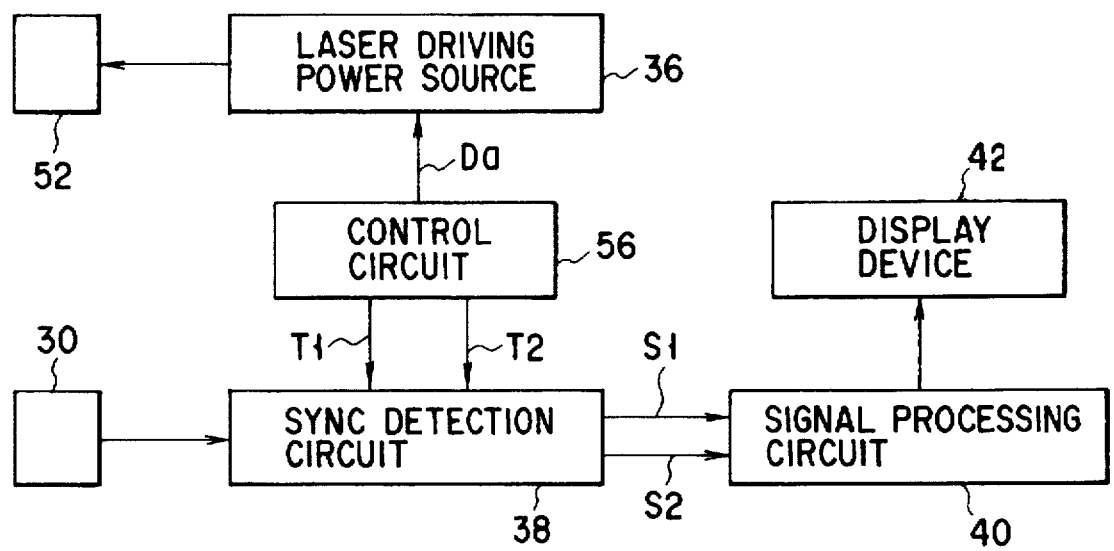
F I G. 9
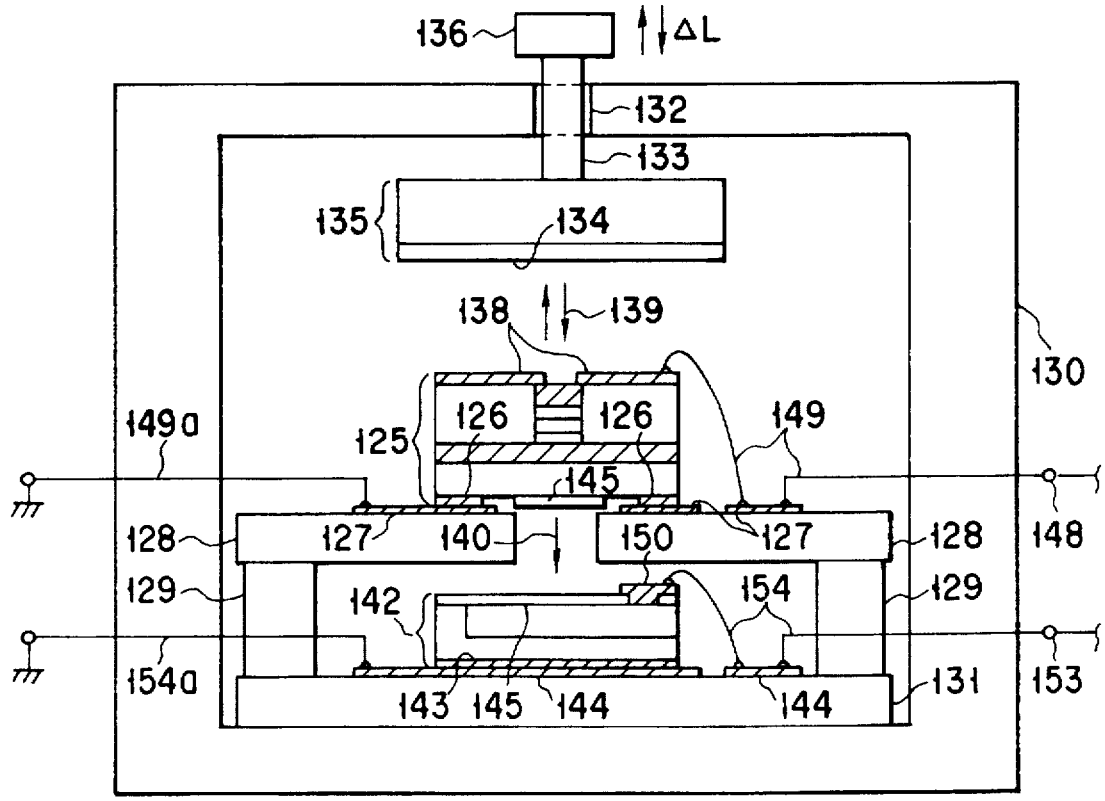
F I G. 10A

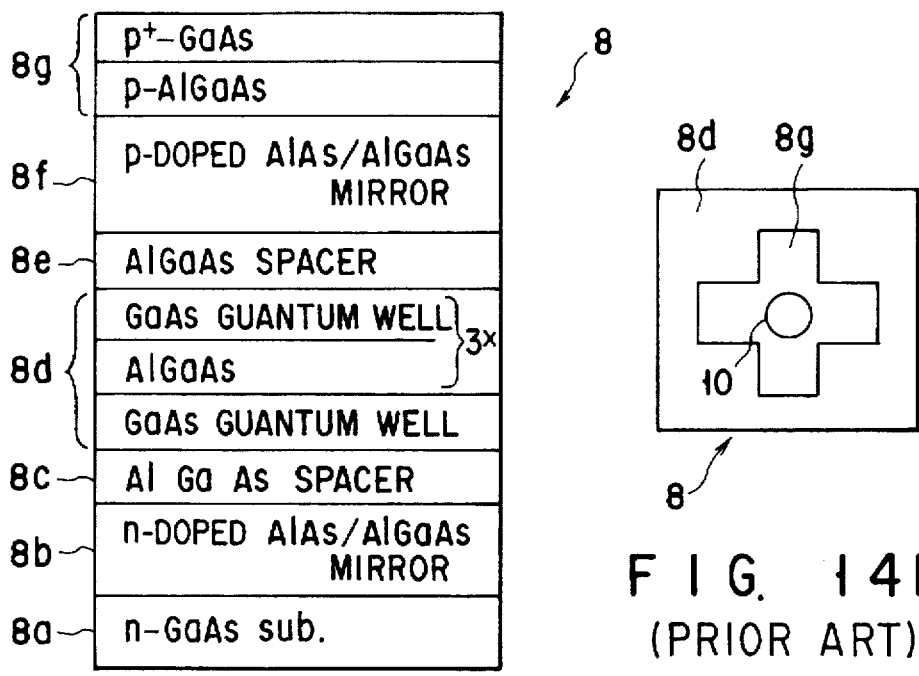
FIG. 14A (PRIOR ART)
FIG. 14B (PRIOR ART)
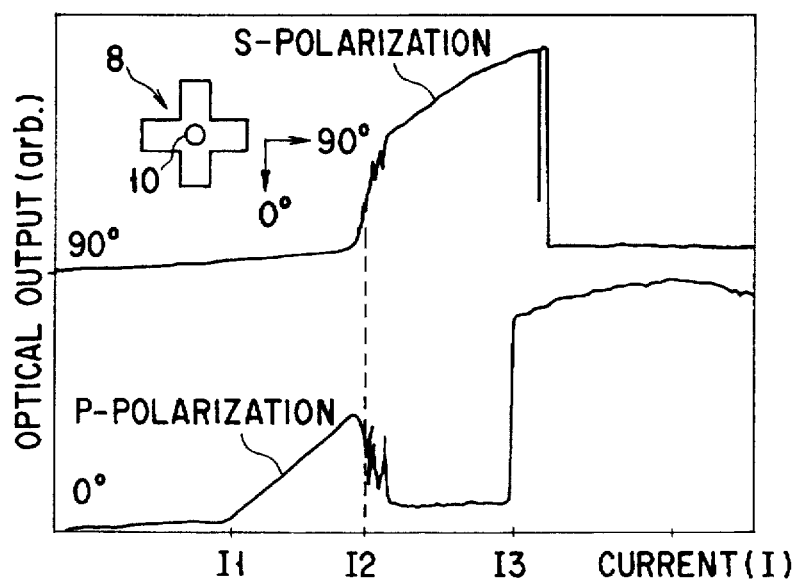
FIG. 15 (PRIOR ART)

OPTICAL DISPLACEMENT SENSOR

BACKGROUND OF THE INVENTION

The present invention relates to an optical displacement sensor for optically detecting an amount of displacement of an object.

As disclosed in Jpn. Pat. Appln. KOKAI Publication No. 7-55423, an optical displacement sensor is known, in which a vertical cavity surface emitting laser and external reflection means are combined to form a compound cavity (hereinafter referred to as prior art.). The optical displacement sensor is constructed such that an amount of relative displacement of the vertical cavity surface emitting laser and the external reflection means is detected on the basis of a change in laser output due to a change in phase of a laser beam fed back from the external reflection means to the vertical cavity surface laser.

In the prior art, to detect an amount of relative displacement of the vertical cavity surface emitting laser and the external reflection means and a direction of the displacement, an optical structure as shown in, for example, FIG. 17A is required. In this optical structure, two vertical cavity surface emitting lasers 2a and 2b are combined with one external reflection means 4, thereby forming two pairs of compound cavities. In the optical path of one vertical cavity surface emitting laser 2b, a phase shift film 7 having a predetermined thickness is formed to provide a phase difference $\phi$ with laser beams traveling through the optical path of the other vertical cavity surface emitting laser 2a.

In this case, outputs from light intensity detecting means 6a and 6b with respect to a displacement $\Delta L$ of the external reflection means 4 are represented by a pair of output signals I1 and I2, generated at periods $\lambda/2$ and having a phase difference $2\phi$. When the output signals I1 and I2 are plotted with a lapse of time t, the phase relationship between the signals, when the external reflection means 4 approaches the vertical cavity surface emitting lasers 2a and 2b (FIG. 18A), is reverse to the phase relationship when the external reflection means is removed therefrom (FIG. 18B). Therefore, according to the prior art, a direction of displacement is detected utilizing the aforementioned relationship.

As the vertical cavity surface emitting laser used in the optical displacement sensor, a vertical cavity surface emitting laser 8 (FIGS. 14A and 14B) is conventionally known. For example, "Appl. Phys. Lett., vol. 64, No. 21 (1994) pp. 2767-2769" by K. D. Choquette et al. and "Technical Digest of Conference on Lasers and Electro-Optics (1993 IEEE Technical Digest Series Volume 11)" disclose such a vertical cavity surface emitting laser which has a polarization changing function.

As shown in FIGS. 14A and 14B, the vertical cavity surface emitting laser 8 comprises an n-type GaAs substrate 8a, an n-type semiconductor multilayer mirror 8b formed thereon, a lower spacer layer 8c, a semiconductor activation layer 8d, an upper spacer layer 8e, a p-type semiconductor multilayer mirror 8f and a p-type contact layer 8g. The p-type contact layer 8g, the p-type semiconductor multilayer mirror 8f and the upper spacer layer 8e form a column having a cross-shaped section, with the peripheral portions being removed. As shown in FIG. 14B, a circular electrode window 10 having a diameter of about 6 μm is formed in an upper surface of the surface emitting laser.

FIG. 15 shows the relationship between an optical output of the laser beam and a current I for driving the vertical cavity surface emitting laser. As evident from FIG. 15, P-polarization (polarized light in the direction of 0°) is dominant on the condition of I1<I<I2, whereas S-polarization (polarized light in the direction of 90°) is dominant on the condition of I2<I<I3. Therefore, the direction of polarization can be suitably changed by changing the driving current I. The P-polarization and S-polarization represent laser beams having vibration directions of the field amplitude in directions perpendicular to each other.

Jpn. Pat. Appln. KOKAI Publication No. 4-242989 discloses anther type of vertical cavity surface emitting laser having a polarization changing function.

In this type of vertical cavity surface emitting laser, as shown in FIG. 16, a cavity 14 having an L-shaped cross section is formed on a semiconductor substrate 12. The cavity 14 includes first and second laser oscillation areas 14a and 14b. When a current is supplied to an upper electrode 16, a laser beam is oscillated from the first laser oscillation area 14a. On the other hand, when a current is supplied to an upper electrode 18, a laser beam is oscillated from the second laser oscillation area 14b.

The polarization direction of a laser beam tends to be biased in the direction of either the major axis or minor axis of the cross section of the cavity 14. Therefore, the polarization direction of the laser beam is switched in directions perpendicular to each other, when a current is supplied to the upper electrode 16 and when a current is supplied to the upper electrode 18. A lower electrode 20 formed on the lower surface of the semiconductor substrate 12 has an output window 22 common to laser beams oscillated from the first and second laser oscillation areas 14a and 14b.

In the prior art as described above (FIGS. 17A, 17B, 18A and 18B), to accurately detect the direction of the relative displacement of the external reflection means 4 and the vertical cavity surface emitting lasers 2a and 2b, it is necessary to suppress the amount of change in phase with a lapse of time in the output signals I1 and I2 to less than ¼ of the signal period with respect to the displacement.

For this reason, it is necessary that the following relationship be satisfied:

$$s \cdot \tan\theta \lambda/8$$

where "θ" represents an angle formed by the reflection surface of the external reflection means and the substrate surface of the vertical cavity surface emitting lasers 2a and 2b, and "s" represents a distance between optical axes of laser beams oscillated from the two vertical cavity surface emitting lasers 2a and 2b.

When λ=μm and s=20 μm are substituted as typical parameters in the above formula, the following relationship is established:

$$\theta < 0.36 \text{deg}$$

Hence, if there is a relative change in inclination between the external reflection means 4 and the vertical cavity surface emitting lasers 2a and 2b, it may be difficult to accurately detect the amount and direction of relative displacement of the external reflection means 4 and the vertical cavity surface emitting lasers 2a and 2b. It is known that although the optical displacement sensor having vertical cavity surface emitting lasers has been described above, the same problem arises in a case where a normal edge-emitting semiconductor laser is used.

BRIEF SUMMARY OF THE INVENTION

An object of the present invention is to provide a simple and compact optical displacement sensor for detecting an amount of change in optical distance between a semiconductor laser and an external reflection means in high resolution and detecting a change in direction of the optical distance without an error, without being influenced by a relative change in inclination between the external reflection means and the semiconductor laser.

In this specification, the term "modulation of an optical distance" has a generic meaning, which includes geometrically changing (modulating) a distance between the semiconductor laser and external reflection means, optically changing (modulating) the distance by changing the refractive index of space or a medium between the semiconductor laser and the external reflection means, changing (modulating) the distance by using optical anisotropy crystal or means for changing polarization of a laser beam, and changing (modulating) the distance by changing (modulating) the wavelength of a laser beam emitted from the semiconductor laser. The meaning of the term "modulation of an optical distance" includes all the means for changing (modulating) the phase of light which is fed back from the external reflection means to the semiconductor laser.

The term "detection of the direction of change in optical distance" means "to detect whether the semiconductor laser and the external reflection means relatively move in the direction in which they approach each other or remove from each other".

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention FIG. 1A is a diagram showing the structure of an optical displacement sensor according to a first embodiment of the present invention;

FIG. 1B is a diagram showing the structure of a detection circuit system used in the optical displacement sensor of the present invention;

FIG. 4 is a diagram showing a Lissajous pattern formed by plotting the pair of optical output signals shown in FIGS. 3B and 3C on two-dimensional coordinates;

FIG. 5 is a diagram showing the structure of an optical displacement sensor according to a second embodiment of the present invention;

FIG. 6 is a diagram showing the structure of an optical displacement sensor according to a third embodiment of the present invention;

FIG. 7 is a diagram showing the structure of an optical displacement sensor according to a fourth embodiment of the present invention;

FIG. 9 is a diagram showing the structure of a detection circuit system used in the optical displacement sensor shown in FIG. 8A;

FIG. 10A is a diagram showing the structure of an optical displacement sensor according to a sixth embodiment of the present invention;

FIG. 14A is a diagram showing an internal structure of a vertical cavity surface emitting laser used in a conventional optical displacement sensor;

FIG. 14B is a top view of the vertical cavity surface emitting laser shown in FIG. 14A;

FIG. 15 is a diagram showing a state in which the polarization direction of the vertical cavity surface emitting laser shown in FIG. 10A is switched by changing the driving current;

DETAILED DESCRIPTION OF THE INVENTION

Figure 2A:
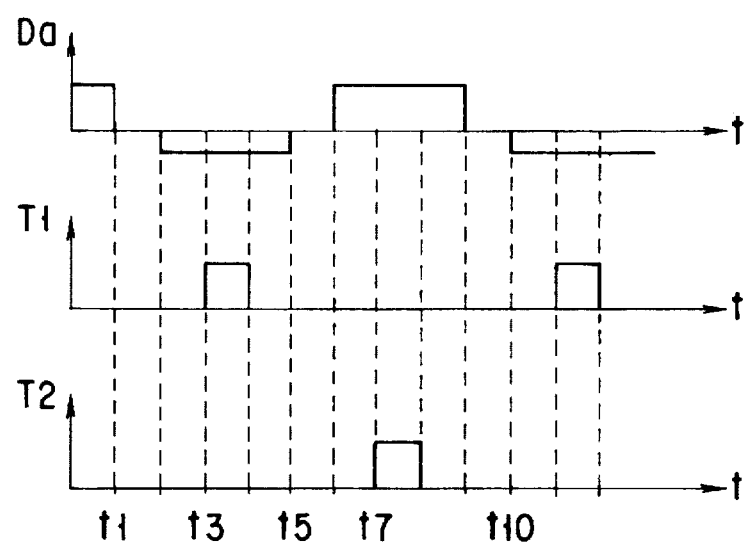
FIG. 2A is a timing chart showing periods of a control signal output from a control circuit to moving means.
Figure 2B:
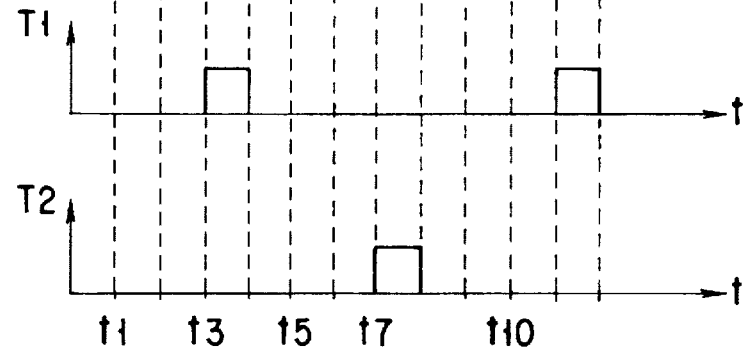
FIGS. 2B and 2C are timing charts showing trigger signals output from the control circuit in synchronism with the control signal.
Figure 2C:
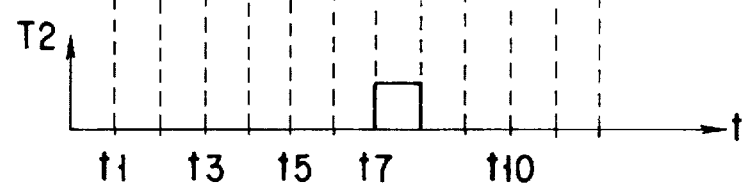

An optical displacement sensor according to a first embodiment of the present invention will be described with reference to FIGS. 1A, 1B, 2A–2C, 3A–3C and 4.

As shown in FIGS. 1A and 1B, the optical displacement sensor of this embodiment comprises an edge-emitting semiconductor laser 24; external reflection means 26 constituting a compound cavity in combination with the edge-emitting semiconductor laser 24; a lens 28 for shaping a laser beam emitted from the edge-emitting semiconductor laser 24 and applying the shaped beam to the external reflection means 26; optical output detecting means 30 for detecting an optical output from the edge-emitting semiconductor laser 24, which changes in accordance with the phase of return light reflected from the external reflection means 26, when an optical distance between the edge-emitting semiconductor laser 24 and the external reflection means 26 changes at a predetermined change rate; optical distance modulation means for changing the optical distance at predetermined periods by the amount of modulation of the optical distance at a rate higher than the aforementioned predetermined change rate; and a detection circuit system for detecting the amount and direction of change in optical distance based on an optical output from the optical output detecting means 30 detected in synchronism with the modulation timing of the optical distance by the optical distance modulation means.

Generally, the edge-emitting semiconductor laser 24 is set such that the area of the cross section of a waveguide of a laser beam emitting section 24a is small and the radiation angle of the laser beam is large. The external reflection means 26 may be, for example, an external mirror having a reflection surface 26a.

The optical distance modulation means comprises moving means 34a and a control circuit 34b for controlling the moving means 34a by a control signal Da. The moving means 34a is attached to a mount 32 on which the optical output detecting means 30 is mounted, and changes the optical distance between the edge-emitting semiconductor laser 24 and the external reflection means 26 by the amount of modulation of the optical distance by moving the edge-emitting semiconductor laser 24 along optical axis.

"The amount of modulation of the optical distance", referred to above in connection with the moving means 34a for changing the optical distance, means a desirable optical distance, excluding the amount of change in optical distance corresponding to an integer number of times the half (½) of the modulation period of the optical output of the outputs from the optical output detecting means 30. This is because, if the phase difference between a pair of optical output signals S1 and S2 to be described later (see FIGS. 3A to 3C) corresponds to an integer number of times ½ of the modulation period of an optical output, the optical output signals S1 and S2 have the same phase or the opposite phases, and it is therefore difficult to detect the direction of change of the optical distance.

The optical output detecting means 30 may be an element, e.g., a photodetector, for converting an optical output of a laser beam to a current value, or means for detecting an optical output in accordance with a change in voltage applied to the edge-emitting semiconductor laser 24. In FIG. 1A, the optical output detecting means 30 is arranged behind the edge-emitting semiconductor laser 24. However, the optical output detecting means 30 can be arranged at any desirable position, so long as it is possible to detect an optical output of the laser beam. For example, the optical output detecting means 30 may be arranged in front of the edge-emitting semiconductor laser 24, or inside or on a side of the compound cavity.

The detection circuit system as shown in FIG. 1B is controlled by a control mechanism (not shown). The system comprises a laser driving power source 36 for driving and controlling the edge-emitting semiconductor laser 24; a sync detection circuit 38 for fetching optical output signals S1 and S2 (see FIGS. 3B and 3C) from the optical detection means in synchronism with trigger signals T1 and T2 (see FIGS. 2A to 2C) output from the control circuit 34b in synchronism with the timings of the control signal Da; a signal processing circuit 40 for calculating an amount of change in optical distance between the edge-emitting semiconductor laser 24 and the external reflection means 26 and a direction of the change of the optical distance by subjecting the pair of optical output signals S1 and S2 to a predetermined signal process; and a display device 42 for displaying data on the amount of change in the optical distance and the direction of the change calculated by the signal processing circuit 40.

An operation of the above embodiment will now be described.

In the following description, it is assumed that the external reflection means 26 is attached to an object of displacement measuring (not shown) via an attachment member 44.

The laser beam output from the edge-emitting semiconductor laser 24 is shaped to a predetermined shape by the lens 28 and then applied to the external reflection means 26 constituting the compound cavity. At this time, the light reflected by the external reflection means 26 is fed back to the edge-emitting semiconductor laser 24 through the lens 28.

The phase of the light fed back to the edge-emitting semiconductor laser 24 is changed at periods of λ/2 with respect to the amount of change of the optical distance between the edge-emitting semiconductor laser 24 and the external reflection means 26. The symbol λ denotes a wavelength of a laser beam transmitted through the optical path between the edge-emitting semiconductor laser 24 and the external reflection means 26.

The optical output of the edge-emitting semiconductor laser 24 varies depending on the phase of the return light. More specifically, when the phase of the return light is the same as that of the laser beam in the edge-emitting semiconductor laser 24, the optical output of the edge-emitting semiconductor laser 24 is intensified. On the other hand, when the phase of the return light is opposite to that of the laser beam in the edge-emitting semiconductor laser 24, the optical output thereof is weakened. In this case, the optical output of the edge-emitting semiconductor laser 24 is changed at periods of λ/2 with respect to the amount of change of the aforementioned optical distance.

In this state, when the moving means 34a is driven in response to the control signal Da (FIG. 2A) output from the control circuit 34b, the edge-emitting semiconductor laser 24 is moved up and down at predetermined periods by the amount of modulation of the optical distance at a rate higher than the change rate of the optical distance between the edge-emitting semiconductor laser 24 and the external reflection means 26. As a result, the optical distance between the edge-emitting semiconductor laser 24 and the external reflection means 26 is changed at predetermined periods. More specifically, as shown in FIG. 2A, the moving means 34a is controlled to a specific amount $\Delta d1$ (not shown) of modulation of the optical distance in a period between times t2 and t5, and another specific amount $\Delta d2$ (not shown) of modulation of the optical distance in a period between times t6 to t9.

The control circuit 34b outputs trigger signals T1 and T2 (FIGS. 2B and 2C) in synchronism with timing of the control signal Da to the sync detection circuit 38. In this case, the trigger signals T1 and T2 are output to the sync detection circuit 38 in synchronism with the change timing of the moving means 34a which is controlled to the amount $\Delta d1$ or $\Delta d2$ of modulation of the optical distance.

In this embodiment, the sync detection circuit 38 fetches the optical output signals S1 and S2 from the optical detection means 30 in synchronism with the rise timings of the trigger signals T1 and T2.

Figure 3A:
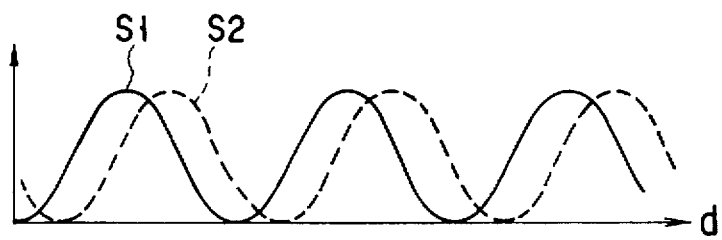
FIG. 3A is a diagram showing the relationship between the output state of an optical output signal and the amount of change in optical distance between a semiconductor laser and external reflection means.

As shown in FIG. 3A, the pair of optical output signals S1 and S2 fetched by the sync detection circuit 38 have a predetermined phase difference with respect to the amount d of change of the optical distance. In FIG. 3A, the amount "d" of change means the amount of change of the optical distance to be measured. It is assumed that the amount "d" does not include a modulated (or changed) amount of the optical distance generated by the optical distance modulation means.

The pair of optical output signals S1 and S2 fetched by the sync detection circuit 38 are subjected to a predetermined signal process by the signal processing circuit 40.

Figure 3B:
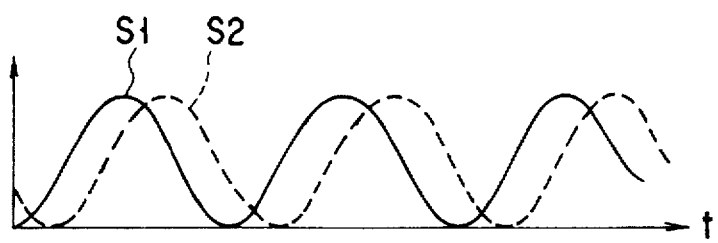
FIGS. 3B and 3C are diagrams showing states of change of a pair of output signals with a lapse of time, when the optical distance changes at a constant rate.
Figure 3C:
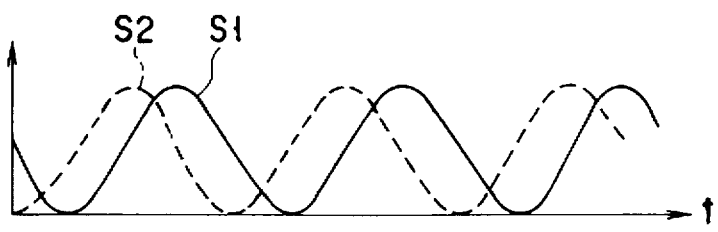

FIGS. 3B and 3C are diagrams showing states in which the pair of output signals S1 and S2 fetched in the sync detection circuit 38 change with the lapse of time, when the optical distance changes at a constant rate. More specifically, FIG. 3B shows a state in which the optical distance is increasing, and FIG. 3C shows a state in which the optical distance is decreasing.

As clear from FIGS. 3B and 3C, the relationship between the phases of the optical output signals S1 and S2, when the optical distance are increasing, is reverse to that when the optical distance is decreasing. Utilizing this relationship, the direction of change in the optical distance can be detected.

A method for detecting the direction of change in the optical distance will be described with reference to the Lissajous pattern (see FIG. 4) formed by plotting on two-dimensional coordinates the pair of optical output signals S1 and S2 which vary as time elapses.

First, when the amount $\Delta d1$ or $\Delta d2$ of modulation of the optical distance of the moving means 34a is constant, the Lissajous pattern is always the same elliptical orbit as shown in FIG. 4. In this case, the direction of rotation of the Lissajous pattern in a case where the optical distance is increasing (the arrow L in FIG. 4) is opposite to that in a case where the optical distance is decreasing (the arrow R in FIG. 4). Note that the diameter of the elliptical orbit shown in FIG. 4 is slightly decreased as the optical distance increases.

For this reason, the amount and direction of change in optical distance can be simultaneously detected in the order smaller than one period of the optical output signals S1 and S2 by calculating back the optical output signals S1 and S2 from the coordinate values on the Lissajous pattern.

Secondly, when the amount $\Delta d1$ or $\Delta d2$ of modulation of the optical distance of the moving means 34a changes, the Lissajous pattern changes with time. However, if the change of the amount $\Delta d1$ or $\Delta d2$ of modulation of the optical distance is less than $\lambda/8$, the direction of the change of the optical distance can be detected on the basis of the direction of rotation of the Lissajous pattern.

The following is an example of calculation for changing the amount $\Delta d$ of modulation of the optical distance, in a case of using PZT (lead zirconium titanate) film as the moving means 34a.

Assuming that a PZT film sandwiched between a pair of electrodes is formed of a plurality of layers, the amount of extension and contraction, i.e., the amount $\Delta d$ of modulation of the optical distance is represented by the following equation:

$$\Delta d = j \cdot d_{33} \cdot V$$

where the number of laminated layers is j, the coefficient of proportion is $d_{33}$, and the voltage applied across the electrodes is V.

When the optical wavelength $\lambda$ is 1 μm, the applied voltage V is 50v and the typical coefficient of proportion $d_{33}$ of the PZT film is $300 \times 10^{-12}$(m/v), to change the amount $\Delta d$ ($\Delta d = \lambda/8$) of modulation of the optical distance of the moving means 34a, it is necessary that the number j of the laminated layers be 8 or 9.

A method for detecting an amount of change in optical distance between the edge-emitting semiconductor laser 24 and the external reflection means 26 is not described above. The amount of displacement can be detected in the following manner. When the optical distance is changed at a constant rate, an optical output from the edge-emitting semiconductor laser 24, which is changed depending on the phase of the return light from the external reflection means 26, can be detected by the optical output detecting means 30. The detected data is signal-processed by the signal processing circuit 40, so that the amount of change of the optical distance can be detected accurately.

Figure 17A:
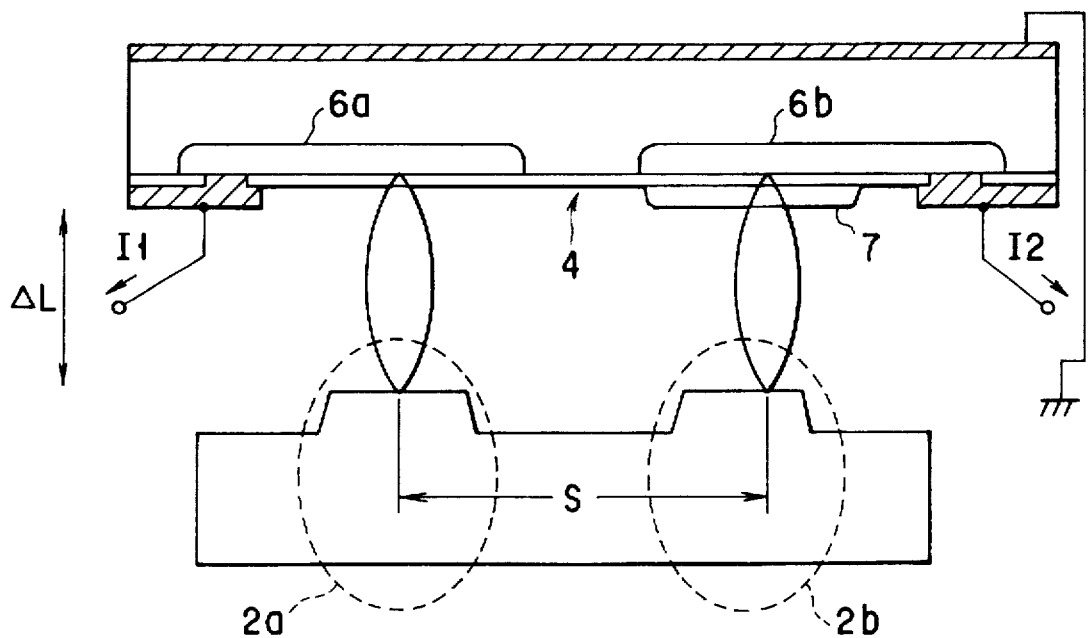
FIG. 17A is a diagram showing an optical structure for detecting the amount and direction of relative displacement of the vertical cavity surface emitting laser and the external reflection means in the conventional optical displacement sensor.
Figure 17B:
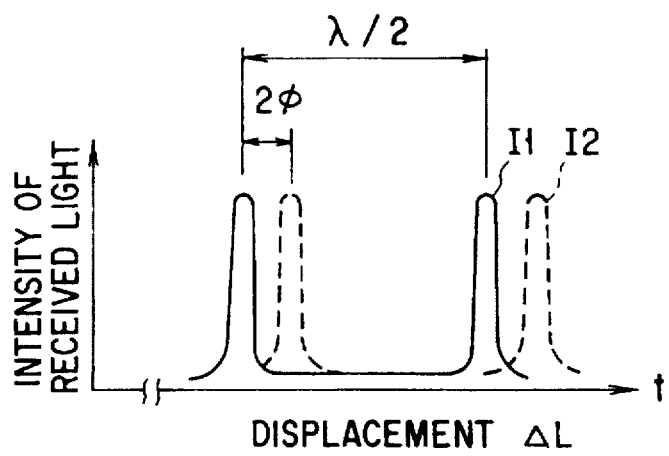
FIG. 17B is a diagram showing a state in which outputs from the light intensity detecting means with respect to displacement of the external reflection means are represented by a pair of output signals, generated at periods λ/2 and having a phase difference.
Figure 18A:
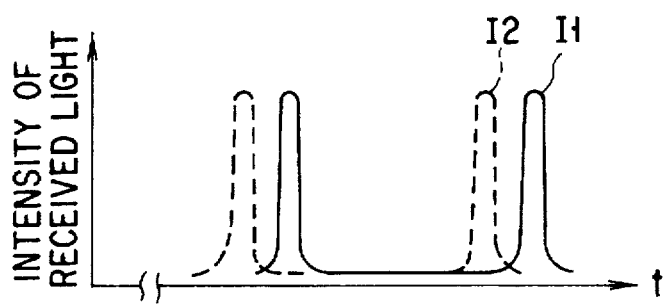
FIG. 18A is a diagram showing the phase relationship between signals, when the external reflection means approaches the vertical cavity surface emitting lasers.
Figure 18B:
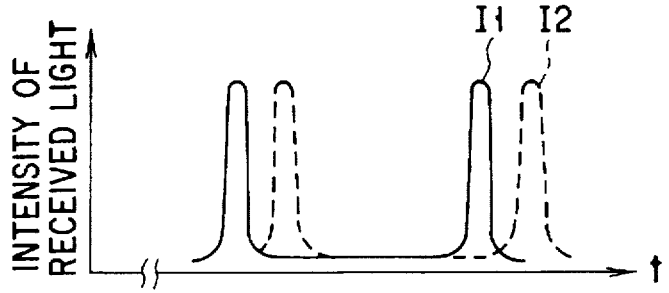
FIG. 18B is a diagram showing the phase relationship between signals, when the external reflection means is removed from the vertical cavity surface emitting lasers.

With the above structure, the amount and direction of a change in optical distance between the edge-emitting semiconductor laser 24 and the external reflection means 26 can be accurately detected by only one pair of compound cavities without requiring two pairs of compound cavities used in the prior art as shown in FIG. 17A. In addition, even if the angle formed by the optical axis of a laser beam emitted from the edge-emitting semiconductor laser 24 and the reflection surface 26a of the external reflection means 26 is slightly changed, the phase difference between the optical output signals S1 and S2 output from the sync detection circuit 38 to the signal processing circuit 40 is not substantially changed, since the compound cavities have a common optical axis. Thus, according to this embodiment, it is possible to provide a simple and compact optical displacement sensor for detecting an amount of a change in optical distance between the external reflection means and the edge-emitting semiconductor laser in high resolution and detecting a change in direction of the optical distance without an error, without being influenced by a relative change in inclination between the external reflection means and the edge-emitting semiconductor laser.

The present invention is not limited to the above embodiment, but can be modified variously without adding new matter. For example, the output from the optical distance modulation means is not limited to the binary notational signals as shown in FIG. 2A, but may be sine wave signals, ternary notational signals, or variable signals having more than three values. In this case also, the same effect and advantage as in the above embodiment can be obtained. Further, the signal processing method includes all method utilizing a pair of phase difference signals, and is not limited to the aforementioned method.

If the amount of modulation of the optical distance of the optical distance modulation means is changed to three or more values, it is only necessary that outputs from the optical output detecting means be separately detected in synchronism with the timing of modulating the amount.

It is possible to use, instead of the edge-emitting semiconductor laser 24, a semiconductor laser incorporating a function of deflecting a light beam emitted from a semiconductor laser against the cavity direction in the semiconductor laser (a surface emission type semiconductor laser). In this case, since the area of a laser beam emitting portion can be larger and the emission angle of the laser beam can be smaller, the lens 28 in the above embodiment is not necessarily required.

An optical displacement sensor according to a second embodiment of the present invention will be described with reference to FIG. 5. In the following, the same structures are identified with the same reference numerals as those of the first embodiment, and the description thereof is omitted.

As shown in FIG. 5, the optical displacement sensor of this embodiment comprises a vertical cavity surface emitting laser 46 in place of the edge-emitting semiconductor laser 24 (FIG. 1A) used in the first embodiment. In the vertical cavity surface emitting laser 46, the area of the waveguide of a laser beam emitting section 46a is greater and the emission angle of the laser beam is smaller as compared to those of the edge-emitting semiconductor laser 24. Therefore, the lens 28 applied to the first embodiment is not necessarily required.

An operation of this embodiment will now be described.

In the following description, it is assumed that external reflection means 26 is attached to an object of displacement measuring (not shown) via an attachment member 44.

The laser beam output from the vertical cavity surface emitting laser 46 is reflected by the external reflection means 26 constituting a compound cavity, and fed back to the vertical cavity surface emitting laser 46. At this time, the optical output from the vertical cavity surface emitting laser 46 varies depending on the phase of the return light. More specifically, when the phase of the return light is the same as that of the laser beam in the vertical cavity surface emitting laser 46, the optical output of the vertical cavity surface emitting laser 46 is intensified. On the other hand, when the phase of the return light is opposite to that of the laser beam in the vertical cavity surface emitting laser 46, the optical output thereof is weakened. In this case, the optical output of the vertical cavity surface emitting laser 46 is changed at periods of $\lambda/2$ with respect to the amount of displacement of the aforementioned optical distance.

In this state, when a moving means 34a is driven in response to a control signal Da (FIG. 2A) output from a control circuit 34b (FIG. 1B), the vertical cavity surface emitting laser 46 is moved up and down at predetermined periods by the amount of modulation of the optical distance at a rate higher than the change rate of the optical distance between the vertical cavity surface emitting laser 46 and the external reflection means 26. Further, as shown in FIG. 1B, a pair of optical output signals S1 and S2 are output to a signal processing circuit 40 in synchronism with trigger signals T1 and T2 output from the control circuit 34b to the sync detection circuit 38. The signals S1 and S2 are sub-jected to a predetermined signal process in the signal processing circuit 40. Based on the result of the signal process, the amount and direction of change of the optical distance is detected.

A method for detecting an amount of change in optical distance between the vertical cavity surface emitting laser 46 and the external reflection means 26 is not described above. The amount of change can be detected in the following manner. When the optical distance is changed at a constant rate, an optical output from the vertical cavity surface emitting laser 46, which is changed depending on the phase of the return light from the external reflection means 26, can be detected by the optical output detecting means 30. The detected data is signal-processed by the signal processing circuit 40, so that the amount of change in optical distance can be detected accurately.

According to the second embodiment, the amount of light fed back from the external reflection means 26 to the vertical cavity surface emitting laser 46 is increased as compared to the case of using an edge-emitting semiconductor laser in which the area of the cross section of the cavity of the laser beam emitting section is relatively small and the radiation angle of the laser beam is relatively great. In addition, even if the external reflection means 26 is inclined, the change of the amount of feedback beam can be suppressed to a minimum.

More specifically, even if the amount of change in optical distance between the vertical cavity surface emitting laser 46 and the external reflection means 26 is great or if the angle formed by the vertical cavity surface emitting layer 46 and the external reflection means 26 is changed, the decrease of the modulation factor of the optical signals S1 and S2 (FIG. 3) according to the amount of change in optical distance can be suppressed to a minimum.

Further, the longitudinal mode of the vertical cavity surface emitting laser 46 is very stable. Therefore, the optical displacement sensor of this embodiment causes substantially no hopping in the longitudinal mode (hopping is a phenomenon in which the oscillation wavelength of the vertical cavity surface emitting laser 46 hops, due to the change in phase or intensity of feedback beam from the external reflection means 26 and the change of the environment). As a result, measurement error or mismeasurement resulting from the hopping in the longitudinal mode can be reduced. The other effect and advantage of this embodiment are the same as those of the first embodiment, and therefore the description thereof is omitted.

An optical displacement sensor according to a third embodiment of the present invention will be described with reference to FIG. 6. In the following, the same structures are identified with the same reference numerals as those of the first and second embodiments, and the description thereof is omitted.

As shown in FIG. 6, in the optical displacement sensor of this embodiment, moving means 34a of optical distance modulation means is interposed between external reflection means 26 and an attachment member 44, so that the external reflection means 26 can be moved in an axial direction of a laser beam.

Since the moving means 34a is thus separated from a vertical cavity surface emitting laser 46, even if the moving means 34a has a high heat resistance or generates a great amount of heat, the amount and direction of the change in optical distance between the vertical cavity surface emitting laser 46 and the external reflection means 26 can be detected accurately, without degrading the optical characteristics of the vertical cavity surface emitting laser 46. The other effect and advantage of this embodiment are the same as those of the first and second embodiments, and therefore the description thereof is omitted. In this embodiment, if a conventional edge-emitting semiconductor laser is used as the laser source, the same advantages as described above can be obtained.

An optical displacement sensor according to a fourth embodiment of the present invention will be described with reference to FIG. 7. In the following, the same structures are identified with the same reference numerals as those of the first to third embodiments, and the description thereof is omitted.

As shown in FIG. 7, the optical displacement sensor of this embodiment comprises refractive index changing means 48 in place of the moving means 34a of the optical distance modulation means applied to the first to third embodiments. The refractive index changing means 48 is controllable by means of a control circuit 34b (FIG. 1B).

The refractive index changing means 48 is located in an optical path between a vertical cavity surface emitting laser 46 and external reflection means 26.

If a reflection surface is formed on the refractive index changing means 48, it is desirable that the surface of the means 48 be coated with AR (acrylic rubber) and that the means 48 be positioned so as not to form the angle of 90° between the reflection surface and the optical axis of a laser beam, in order to reduce the amount of light fed back from the reflection surface to the semiconductor laser.

The refractive index changing means 48 applied to this embodiment is constructed so as to change the refractive index of at least part of the optical path within the compound cavity. For example, it has an electro-optic effect, Stark effect for entrapping quantum, Franz-Keldysh effect, band filling effect, plasma effect, etc. For this reason, the optical distance can be modulated in a shorter period as compared to the case of using the moving means 34a in the optical distance modulating means (see the descriptions of the first to third embodiments).

Therefore, even if the optical distance between the vertical cavity surface emitting laser 46 and the external reflection means 26 is changed at a high speed, the optical distance can be modulated by the refractive index changing means 48 in a short time period by a predetermined amount of modulation of the optical distance. For this reason, an amount of change in optical distance between the vertical cavity surface emitting laser 46 and the external reflection means 26 can be detected in high resolution and a change in direction of the optical distance can be also detected without an error. The other effect and advantage of this embodiment are the same as those of the first to third embodiments, and therefore the description thereof is omitted.

As the refractive index changing means 48, it is possible to apply means which has a low response and changes the refractive index by an optical elastic effect and thermal action, as well as the means used in the above embodiments.

An optical displacement sensor according to a fifth embodiment of the present invention will be described with reference to FIGS. 8A to 8C and 9. In the following, the same structures are identified with the same reference numerals as those of the first to fourth embodiments, and the description thereof is omitted.

Figure 8A:
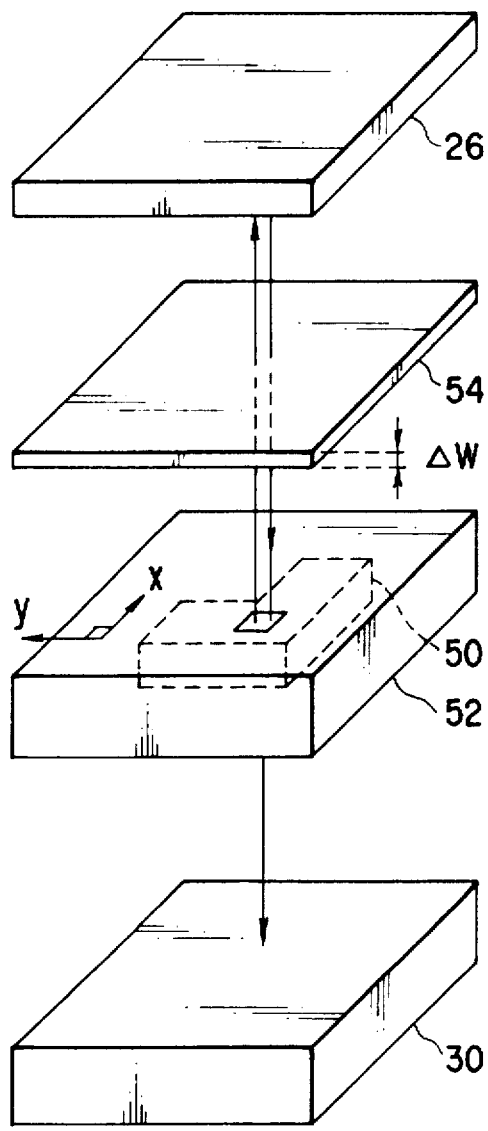
FIG. 8A is an exploded perspective view showing the structure of an optical displacement sensor according to a fifth embodiment of the present invention.

As shown in FIG. 8A, the optical displacement sensor of this embodiment comprises a vertical cavity surface emitting laser 52 incorporating polarization changing means 50 which can change the direction of polarization of a laser beam and an optical anisotropy material 54 located between the vertical cavity surface emitting laser 52 and external reflection means 26. The polarization changing means 50, the anisotropy material 54 and a control circuit 56 (to be described later) constitute optical distance modulation means.

Figure 16:
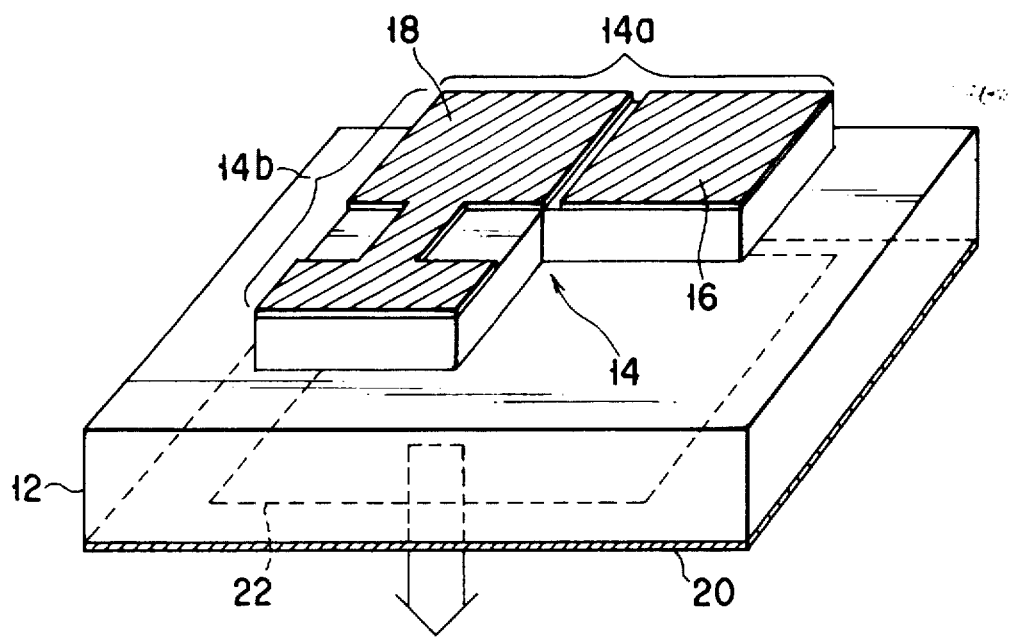
FIG. 16 is a perspective view of a vertical cavity surface emitting laser having a polarization changing function used in the conventional optical displacement sensor.

As the vertical cavity surface emitting laser 52 incorporating the polarization changing means 50, a vertical cavity surface emitting laser shown in FIG. 16 can be used (see Jpn. Pat. Appln. KOKAI Publication No. 4-242989).

The anisotropy material 54 is formed of, for example, optical anisotropic crystal which has a characteristic of changing the refractive index depending on the direction of polarization of the laser beam, so that the optical distance between the vertical cavity surface emitting laser 52 and the external reflection means 26 can be changed by a predetermined amount of modulation of the optical distance, when the direction of the polarization of the laser beam is changed.

Further, as shown in FIG. 9, the detection circuit system, for detecting the amount and direction of change in optical distance between the vertical cavity surface emitting laser 52 and the external reflection means 26, basically has the same structure and function as those of the detection circuit system shown in FIG. 1B. However, the system of this embodiment is different from the system of FIG. 1B in that the polarization changing means 50 is controlled by controlling the laser driving power source 36 on the basis of a predetermined control signal Da output from the control circuit 56.

Assume that a laser beam output from the vertical cavity surface emitting laser 52 is split into polarized lights along x and y axes, and the light polarized in the x direction is called S-polarization and the light polarized in the y direction is called P-polarization. It is desirable that the main axis of the optical anisotropy material 54 (an axis along a polarization direction which effects a maximum refractive index in a plane perpendicular to the optical axis) be located at a position parallel with the x or y axis (hereinafter referred to as an optimal position).

An operation of this embodiment will now be described.

Regarding a laser beam emitted downward from the vertical cavity surface emitting laser 52, as shown in FIG. 8A, the intensity of the laser beam is detected by the optical output detecting means 30.

On the other hand, a laser beam emitted upward from the vertical cavity surface emitting laser 52 is irradiated to the external reflection means 26 through the optical anisotropy material 54, and then fed back to the vertical cavity surface emitting laser 52 again through the optical anisotropy material 54.

At this time, the optical output from the vertical cavity surface emitting laser 52 varies depending on the phase of the fed back beam. More specifically, the optical output is changed at periods of λ/2 with respect to the amount of change of the aforementioned optical distance.

Figure 8B:
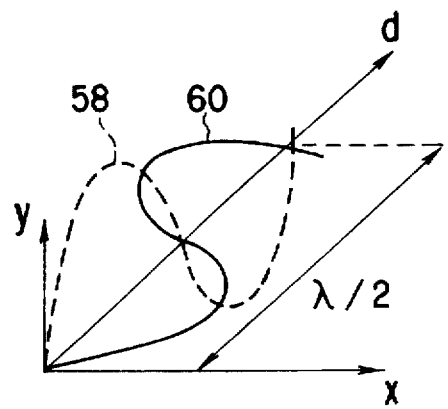
FIG. 8B is a diagram showing a state in which the P-polarization and the S-polarization of light fed back from the external reflection means to the laser are in the same phase with respect to the amount of change in optical distance between the external reflection means and the vertical cavity surface emitting laser, when an optical anisotropy material is removed from the optical path.

If the optical anistropy material 54 is removed from the optical path, when the laser beam emitted upward from the vertical cavity surface emitting laser 52 is reflected by the external reflection means 26 and fed back to the vertical cavity surface emitting laser 52, the optical phases of both the P-polarization 58 and the S-polarization 60 of the feedback beam are the same with respect to the amount d of change in optical distance between the vertical cavity surface emitting laser 52 and the external reflection means 26 (FIG. 8B).

If the optical anisotropic material 54 is located at the optimal position, the refractive index of the optical anisotropy material 54 varies depending on the direction of polarization. Therefore, when the laser beam emitted upward from the vertical cavity surface emitting laser 52 is reflected by the external reflection means 26 and fed back to the vertical cavity surface emitting laser 52, the optical phases of the P-polarization 58 and the S-polarization 60 of the feedback beam are different, having a predetermined phase difference with respect to the amount d of change in optical distance (FIG. 8C).

Figure 8C:
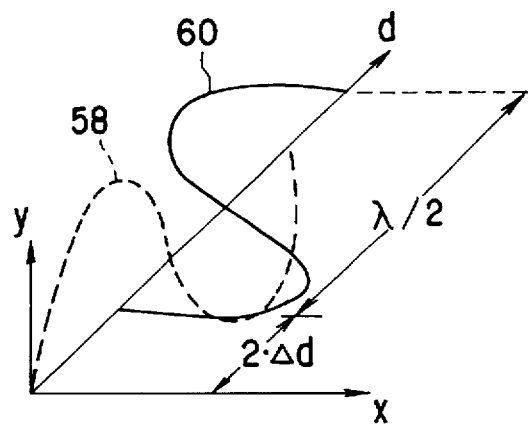
FIG. 8C is a diagram showing a state in which there is a phase difference between the P-polarization and the S-polarization of light fed back from the external reflection means to the laser, when an optical anisotropy material is placed in the optical path.

Referring to FIGS. 8B and 8C, the amount d of change means the amount of change of the optical distance to be measured. It is assumed that the amount d does not include a modulated (or changed) amount of the optical distance generated by the optical anisotropy member 54 (hereinafter referred to as a modulated amount Δd of the optical distance).

In this embodiment, it is preferable that the modulated amount Δd of the optical distance be set to satisfy the following relationship:

$$\Delta d = (2m-1)\lambda/8$$

where λ represents the wavelength of the laser beam and m represents a natural number.

When the laser beam passes through the optical anisotropy member 54 having a thickness T, if there is a difference Δn in refractivity index, the difference in optical path between the P-polarization 58 and the S-polarization 60 is expressed by Δn·T. Thus, it is necessary that the difference in optical path be equal to the modulated amount Δd of the optical distance. Accordingly, an optimal thickness T of the anisotropy member 54 is obtained by the equation Δd=Δn·T. For the reasons stated above, it is preferable that the thickness T of the anisotropy member 54 satisfy the following relationship:

$$T = \{\lambda/(8 \cdot \Delta n)\} \cdot (2m-1)$$

Δn: Difference in refractivity index between the P-polarization 58 and the S-polarization 60.

In the state as described above, when the polarization changing means 50 is switch-controlled by the control signal Da output from the control circuit 56, the optical distance is changed at predetermined periods by the modulated amount Δd of the optical distance at a rate higher than the rate of a change in distance between the vertical cavity surface emitting laser 52 and the external reflection means 26.

The control circuit 56 outputs trigger signals T1 and T2 (see FIGS. 2B and 2C) to the sync detection circuit 38 in synchronism with the timing of the control signal Da. The trigger signals T1 and T2 are input to the sync detection circuit 38 in synchronism with the switch timing of the polarization changing means 50 controlled to the modulated amount Δd of the optical distance.

In this case, the sync detection circuit 38 fetches optical signals S1 and S2 from the optical output detecting means 30 in synchronism with the rise timings of the trigger signals T1 and T2 (see FIGS. 2B and 2C) corresponding to, for example time t3 and t7.

At this time, the optical output signals S1 and S2 fetched by the sync detection circuit 38 have a predetermined phase difference with respect to the amount d of change of the optical distance. More specifically, the laser beam emitted from the vertical cavity surface emitting laser 52 and the laser beam reflected by the external reflection means 26 and returned to the laser 52 have a difference in optical path of 2ad=(2m−1)λ/4. Thus, the sync detection circuit 38 fetches the optical output signals S1 and S2 having a phase difference of ¼ of the modulation period with respect to the amount d of change of the optical distance.

The optical output signals S1 and S2 fetched by the sync detection circuit 38 are subjected a predetermined signal process by the signal processing circuit 40.

Thereafter, the signal processing circuit 40 converts the pair of optical output signals S1 and S2 to signals representing the amount and direction of change of the optical distance, and outputs them to the display device 42.

Since this embodiment does not require mechanical moving means which is low in response time, the displacement at a higher speed can be detected accurately. The other effect and advantage of this embodiment are the same as those of the first to fourth embodiments, and therefore the description thereof is omitted.

The present invention is not limited to the above embodiments, but can be modified variously without adding new matter. For example, it is not necessary that the optical anisotropic member 54 have optical anisotropy by itself, but it is possible to apply an electric field or external force change to a material having an electro-optical effect, so that the reflective index of the material can be changed. Further, the optical distance can be changed by rotating at least one of the vertical cavity surface emitting laser 52 and the optical anisotropy member 54 around the optical axis of the laser beam.

An optical displacement sensor according to a sixth embodiment of the present invention will be described with reference to FIGS. 10A to 10C, 11A to 11C, 12 and 13.

As shown in FIG. 10A, a vertical cavity surface emitting laser (SEL) 125 applied to this embodiment is fixed to a heat sink 128 via a lower electrode 126 and a bonding pad 127. The heat sink 128 is fixed to a heat sink 131 for a light receiving element via a fixing member 129. The heat sink 131 is placed in a housing 130.

A support rod 133 is inserted through a guide hole 132 in an upper portion of the housing 130. External reflection means 135 is supported by a lower end portion of the support rod 133 such that a reflection surface 134 faces the vertical cavity surface emitting laser 125. An attachment portion 136, to which an object (not shown) to be measured is attachable, is fixed to an upper end portion of the support rod 133. With this structure, the external reflection means 135 is displaced relative to the vertical cavity surface emitting laser 125 in accordance with the displacement of the object to be measured. The external reflection means 135 may be, for example, an external mirror having the reflection surface 134.

In the above structure, the external reflection means 135 and the vertical cavity surface emitting laser 125 constitute a compound cavity. In this case, a laser beam 139, emitted from a beam emission window 138a (see FIGS. 11A and 11B) of an upper electrode 138 of the vertical cavity surface emitting laser 125, is irradiated to the external reflection means 135. On the other hand, a laser beam 140, emitted from a beam emission window 126a of a lower electrode 143, is irradiated to a light receiving element (PD) 142 fixed to the heat sink 131 via a lower electrode 143 and a bonding pad 144.

To suppress formation of a compound cavity between the vertical cavity surface emitting laser 125 and the light receiving element 142, low reflectance films 145 are formed in the beam reflection window 126a and on the right receiving element 142. The low reflectance films 145 are not necessarily required, if the rear surface of the vertical cavity surface emitting laser 125, in which the beam emission window 126a is formed, and the light receiving surface of the light receiving element 142 have low reflectance.

Figure 10B:
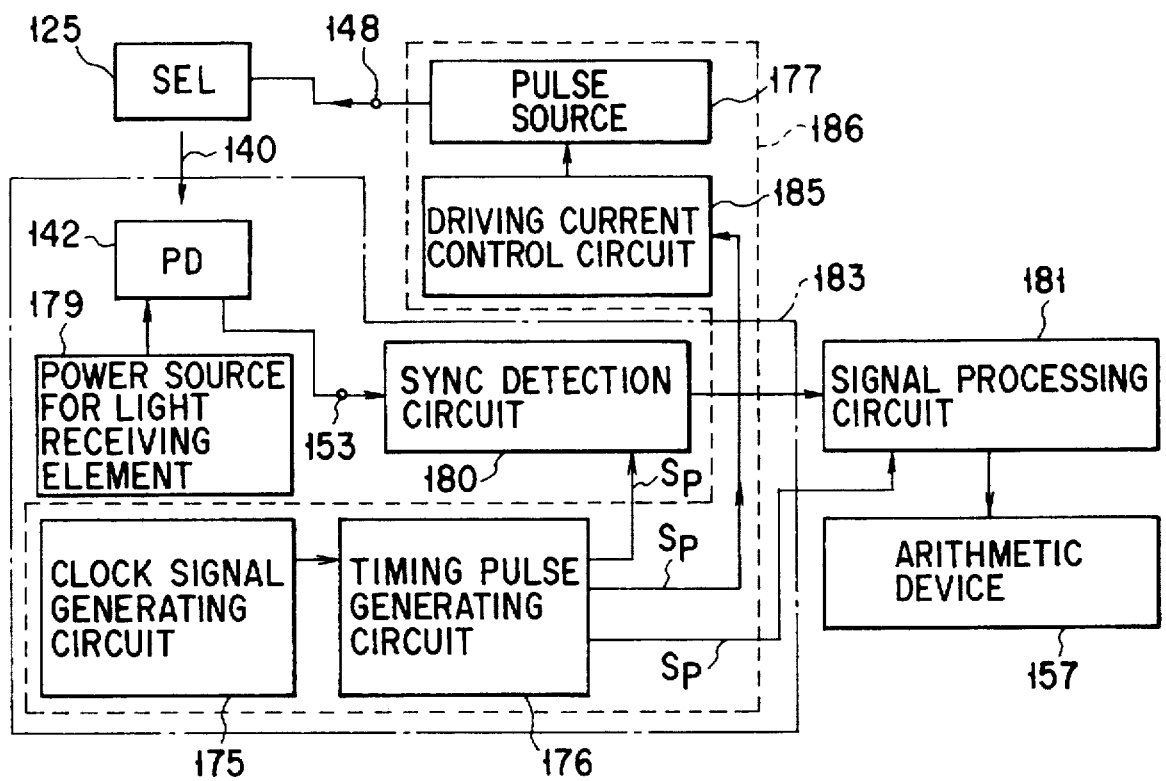
FIG. 10B is a diagram showing the structure of a detection circuit system used in the optical displacement sensor shown in FIG. 10A.

As shown in FIGS. 10A and 10B, laser driving means 186 is electrically connected to the vertical cavity surface emitting laser 125, so that the oscillation wavelength of the vertical cavity surface emitting laser 125 can be controlled (changed or modulated) by the laser driving means 186. More specifically, the upper electrode 138 of the vertical cavity surface emitting laser 125 is electrically connected to a pulse source 177 via an electric wire 149 and a contact terminal 148. The lower electrode 126 is grounded via an electric wire 149a.

A driving current control circuit 185 is connected to the pulse source 177. The driving current control circuit 185 controls outputs of the pulse source 177 in synchronism with a pulse signal $S_P$ output from a timing pulse generating circuit 176. The timing pulse generating circuit 176 is controlled so as to output the pulse signal $S_P$ on the basis of a clock signal output from a clock signal generating circuit 175 at constant timings.

Figure 10C:
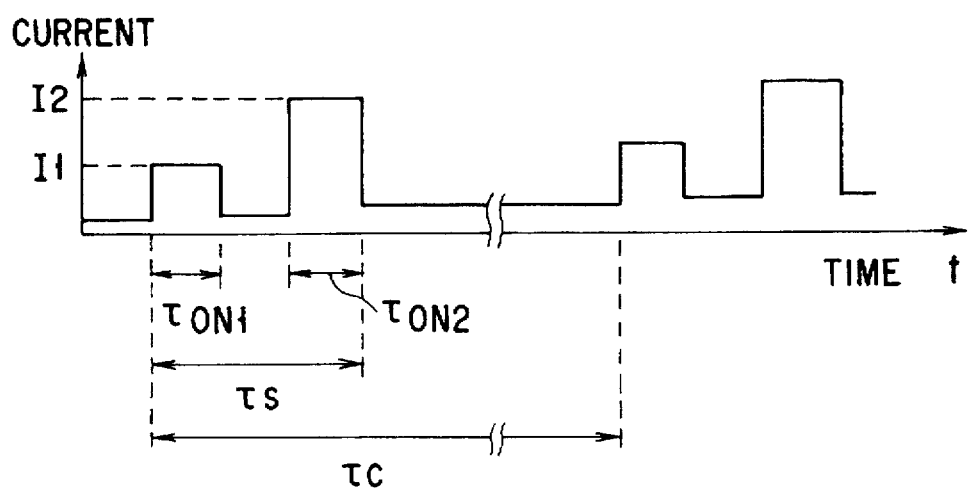
FIG. 10C is a timing chart of a driving current supplied to the vertical cavity surface emitting laser shown in FIG. 10A.

According to this embodiment, driving currents I1 and I2 are supplied from the pulse source 177 to the vertical cavity surface emitting laser 125 at timings as shown in FIG. 10C. More specifically, the driving current I1 is output at a constant period $\tau_c$ and supplied for a time $\tau_{ON1}$. The driving current I2 is output at a constant period $\tau_c$, a time $\tau_s$ behind the time when the driving current I1 is output, and supplied for a time $\tau_{ON2}$.

Figure 11A:
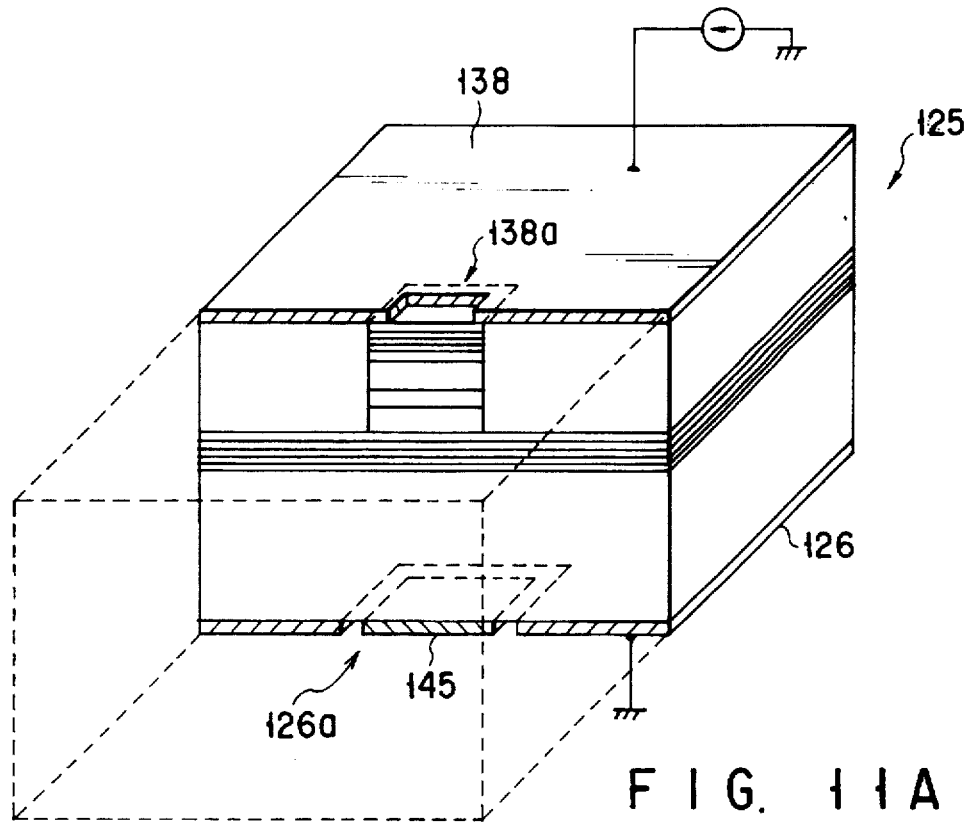
FIG. 11A is a diagram showing a cross section of the vertical cavity surface emitting laser shown in FIG. 10A.
Figure 11B:
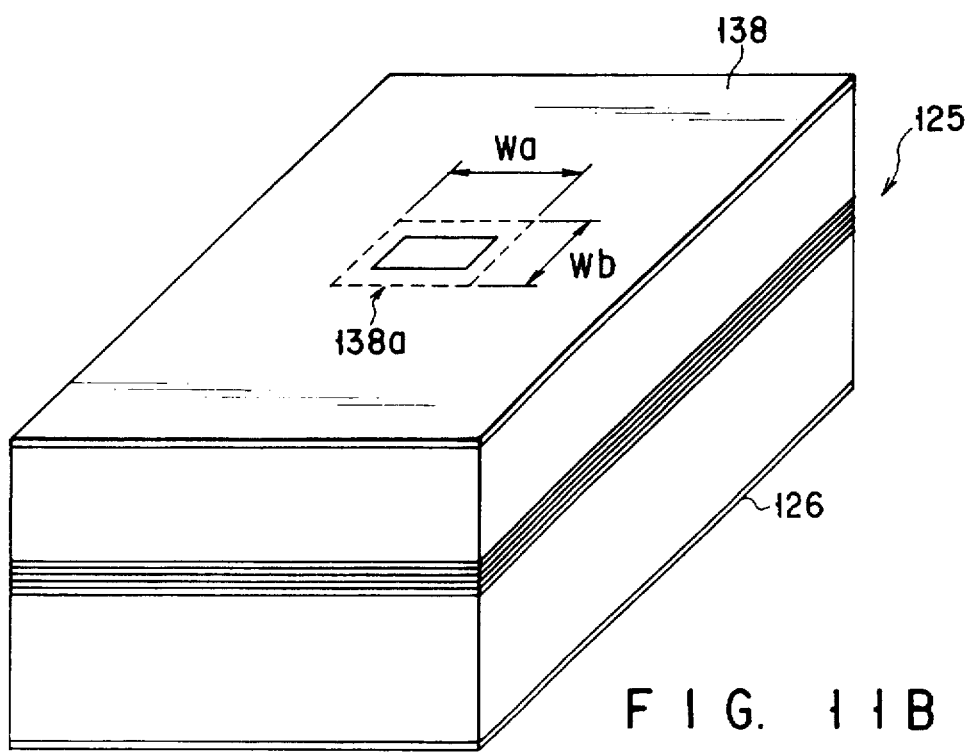
FIG. 11B is a perspective view of the vertical cavity surface emitting laser shown in FIG. 10A.

A method for controlling the oscillation wavelength of the vertical cavity surface emitting laser 125 by means of the driving current I1 and I2 will now be described with reference to FIGS. 11A to 11C.

Normally, if the size (Wa×Wb) of the waveguide (the beam emission window 138a) of the vertical cavity surface emitting laser 125 is greater than a certain value, the transverse mode of light traveling through the waveguide is hopped by spatial holeburning effect in accordance with the current value I of the driving current. At this time, the oscillation wavelength of the vertical cavity surface emitting laser 125 is changed by the change in refractivity index of light resonated in the waveguide.

To change the oscillation wavelength due to the hopping in the transverse mode, it is preferable that at least one of the widths Wa and Wb (see FIG. 11B) of the waveguide be 5 μm or greater. For example, if one of the width (Wa) is 5 μm or greater (5 μm≦Wa), the oscillation wavelength can be changed by setting the other width (Wb) in a range of 1 μm≦Wb≦50 μm.

Figure 11C:
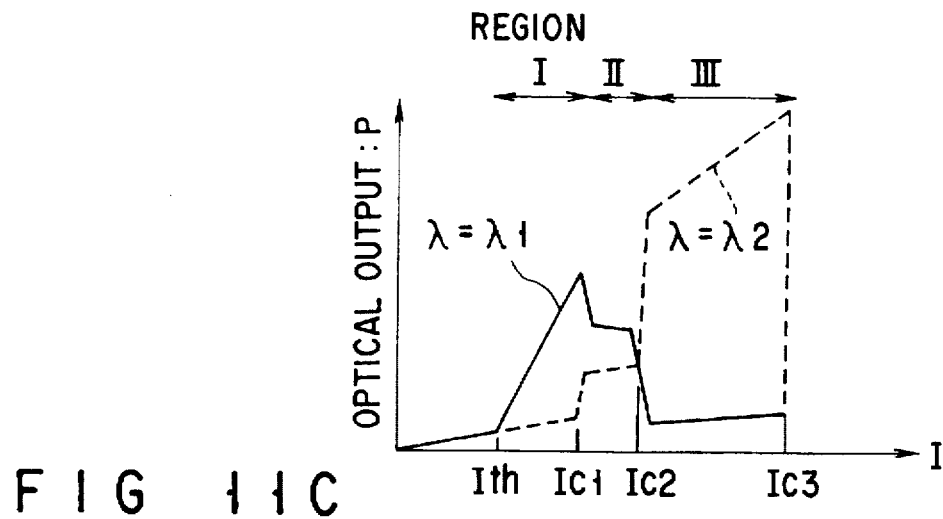
FIG. 11C is a diagram showing the relationship between a current value I of the driving current and an optical output P of the vertical cavity surface emitting laser.

FIG. 11C shows the relationship between a current value I of the driving current and an oscillation wavelength λ (optical output P) of the vertical cavity surface emitting laser 125, in a case where the width Wa and Wb of the optical waveguide are set in the ranges as described above.

As shown in FIG. 11C, in a region I in which the driving current is varied from $I_{th}$ to $I_{c1}$, the oscillation wavelength λ is λ1; and in a region III in which the driving current is varied from $I_{c2}$ to $I_{c3}$, the oscillation wavelength λ is λ2. In a region II in which the driving current is varied from $I_{c1}$ to $I_{c2}$, the oscillation wavelength λ can be both λ1 and λ2.

If the current value I of the driving current is set to $I_{th}<I<I_{c1}$, the oscillation wavelength λ of the vertical cavity surface emitting laser 125 can be set to λ1, whereas if the current value I of the driving current is set to $I_{c2}<I<I_{c3}$, the oscillation wavelength λ can be set to λ2.

Thus, if the driving currents I1 and I2 output from the pulse source 177 are set to, for example, $I_{th}<I1<I_{c1}$ and $I_{c2}<I2<I_{c3}$, the oscillation wavelength λ can be switched between λ1 and λ2 in synchronism with the pulse signal $S_P$ output from the timing pulse generating circuit 176.

An upper electrode 150 of the light receiving element 142 is electrically connected to a sync detection circuit 180 through an electric wire 154 and a contact terminal 153. The light receiving element is connected to a light receiving element power source 179, and controlled by a current output from the power source 179. The sync detection circuit 180 is electrically connected to an arithmetic device 157 via a signal processing circuit 181. The lower electrode 143 of the light receiving element 142 is grounded through an electric wire 154a. In this structure, the circuit system identified by a reference numeral 183 in FIG. 10B forms a measuring circuit for individually measuring optical outputs from the vertical cavity surface emitting laser 125 in accordance with the timings of supplying the driving currents I1 and I2.

An operation of the above embodiment will be described.

In the following descriptions, it is assumed that the driving currents I1 and I2 are set to $I_{th}<I1<I_{c1}$ and $I_{c2}<I2<I_{c3}$.

A pulse signal $S_P$ is output from the timing pulse generating circuit 176 in response to the clock signal output from the clock signal generating circuit 175 at constant timing, and supplied to the driving current control circuit 185, the sync detection circuit 180 and the signal processing circuit 181.

The driving current control circuit 185 controls an output from the pulse source 177 in synchronism with the pulse signal $S_P$. At this time, the driving currents I1 and I2 are supplied from the pulse source 177 to the vertical cavity surface emitting laser 125.

Thus, in accordance with the timing of supplying the driving currents I1 and I2, two laser beams having different wavelengths are output from the beam emission windows 126a and 138a of the vertical cavity surface emitting laser 125.

At this time, two optical output signals, output from the light receiving element 142 in accordance with the intensity of the laser beams having different wavelengths, are fetched by the signal processing circuit 181 through the sync detection circuit 180 in synchronism with the pulse signal $S_P$.

The two optical output signals (e.g., S1 and S2) fetched by the sync detection circuit 181 have a predetermined phase difference with respect to the amount d of change of the optical distance, as shown in FIG. 3A.

As shown in FIGS. 3B and 3C, the optical output signals S1 and S2 vary as the optical distance changes. More specifically, the phase relationship between the signals S1 and S2, in a case where the optical distance is increasing, is reverse to the phase relationship in a case where the optical distance is decreasing.

By utilizing the relationships, the signal processing circuit 181 is controlled so as to detect the direction of change of the optical distance and output a detection signal D to the arithmetic device 157.

In this embodiment, for example, the signal processing circuit 181 outputs a detection signal "+1", when the optical distance is increasing, and a detection signal "−1" when the optical distance is decreasing.

Further, the signal processing circuit 181 is controlled so as to count the number of peak values of at least one of the optical output signals S1 and S2 (e.g., the optical output signal S1 of the wavelength λ) and output the count value Np to the arithmetic device 157.

The arithmetic device 157 is controlled so as to calculate an amount ΔL of change of the optical distance based on the detection signal D (±1) and the count value Np. More specifically, the arithmetic device 157 is controlled to execute the calculation of $\Delta L = D \times Np \times \lambda/2$.

When the optical distance continues increasing, the arithmetic device 157 continuously executes the calculation of ΔL=(+1)×Np×λ/2 based on the detection signal "+1" output from the signal processing circuit 181 and adds the results of the respective calculations. As a result, the amount of increase of the optical distance with respect to the count start position of the peak value is calculated.

When the optical distance continues increasing, the arithmetic device 157 continuously executes the calculation of ΔL=(−1)×Np×λ/2 based on the detection signal "−1" and adds the results of the respective calculations. As a result, the amount of decrease of the optical distance with respect to the count start position of the peak value is calculated.

The signal processing circuit 181 is controlled so as to output a reset signal for resetting the count value Np to the arithmetic device 157, when the direction of change in the optical distance is reversed, during the calculation of the amount ΔL of change. In this case, the arithmetic device 157 calculates again an amount of change of the optical distance in synchronism with the reset signal.

As described above, according to this embodiment, since laser beams of different wavelengths are emitted through the same beam emission window, even if the angle formed by the optical axis of each laser beam and the reflection surface 134 of the external reflection means 135 is slightly changed, the phase relationship between the laser beams does not change. For this reason, the amount of change of the optical distance can be detected in high resolution and the direction of change can be detected without an error. The other effect and advantage of this embodiment are the same as those of the first to fifth embodiments, and therefore the description thereof is omitted.

Figure 12:
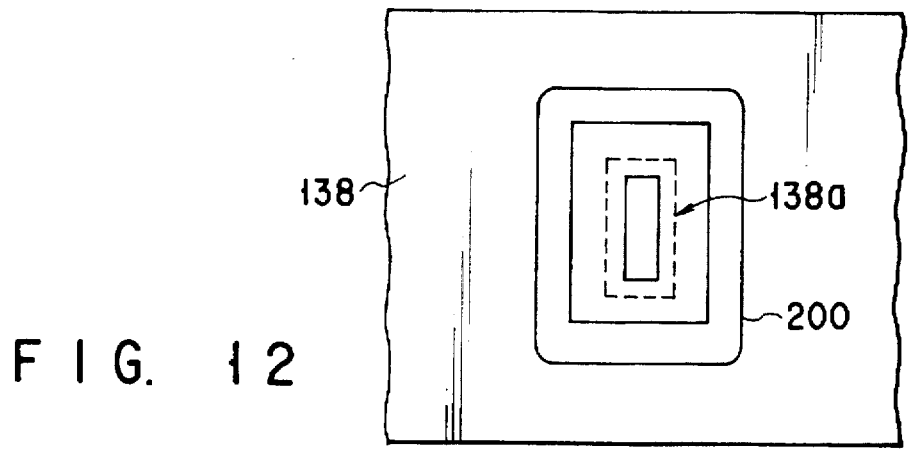
FIG. 12 is a plan view showing a modification of the optical displacement sensor according to the sixth embodiment of the present invention.

In this embodiment, as shown in FIG. 12, a heating element 200 (e.g., a metal thin film made of titanium or the like), instead of the laser driving means 186, may be formed on the upper electrode 138 of the vertical cavity surface emitting laser 125 so as to surround the beam emission window 138a. In this case, laser beams of different wavelengths can be emitted by heating the heating element 200 at predetermined timings and heating an area around the beam emission window 138a.

Figure 13:
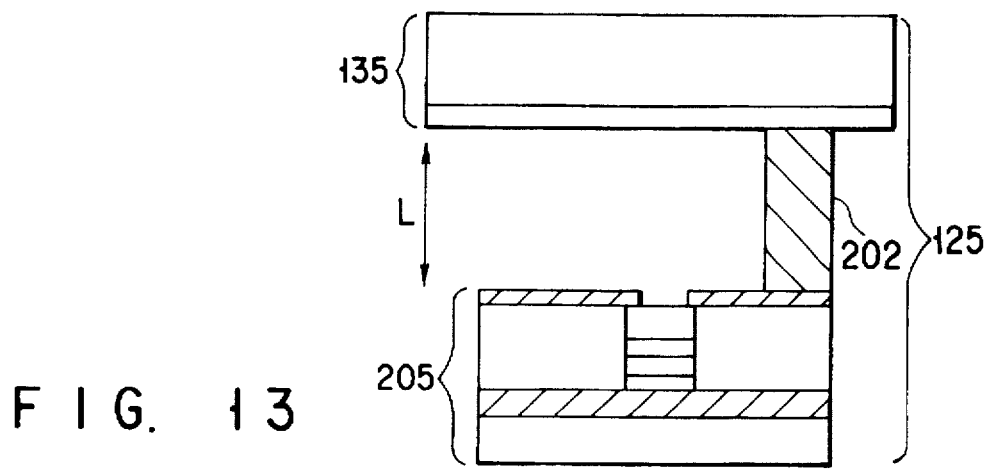
FIG. 13 is a plan view showing another modification of the optical displacement sensor according to the sixth embodiment of the present invention.

It is also possible to provide, instead of the laser driving means 186, an actuator 202 as shown in FIG. 13 (e.g., a piezo-electric element) for mechanically changing the distance L between the upper mirror layer 135 of the vertical cavity surface emitting laser 125 and a portion 205 of the laser 125, separated from the upper mirror portion 135. In this case, the actuator 202 is driven at predetermined timings to change the distance L, thereby emitting laser beams of different wavelengths.

Further, the mechanism for switching or changing the oscillation wavelength of the laser is not limited to that of the above embodiment. Furthermore, the laser source is not limited to a vertical cavity surface emitting laser but can be any thing that has a mechanism for switching or changing the oscillation wavelength. For example, an edge-emitting semiconductor laser can be used as the laser source.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

We claim:

1. An optical displacement sensor comprising:

a semiconductor laser;

external reflection means forming a compound cavity in combination with the semiconductor laser;

optical output detecting means for detecting an optical output from the semiconductor laser, which changes in accordance with the phase of return light reflected by the external reflection means, when an optical distance between the semiconductor laser and the external reflection means changes at a change rate;

optical distance modulation means for changing the optical distance at predetermined periods by an amount of modulation of the optical distance at a rate higher than the change rate; and a detection circuit system for detecting the amount and direction of change of the optical distance based on an optical output from the optical output detecting means detected in synchronism with a timing of modulating the optical distance by the optical distance modulation means.

2. The optical displacement sensor according to claim 1, wherein the semiconductor laser is a vertical cavity surface emitting laser.

3. The optical displacement sensor according to claim 1, wherein the optical distance modulation means comprise moving means for changing the optical distance between the semiconductor laser and the external reflection means by a predetermined amount and control circuit for controlling the moving means.

4. The optical displacement sensor according to claim 1, wherein the optical distance modulation means comprise refractive index changing means, located in an optical path between the semiconductor laser and the external reflection means, for changing a refractive index of at least part of an optical path of the compound cavity, thereby changing the optical distance by the amount of modulation of the optical distance.

5. The optical displacement sensor according to claim 1, wherein the optical distance modulation means comprise an optical anisotropy member which has a characteristic of changing an refractive index depending on a direction of polarization of a laser beam, and polarization changing means, incorporated or integrated in the semiconductor laser, for changing the direction of polarization of the laser beam.

6. The optical displacement sensor according to claim 1, wherein the amount Δd of modulation of the optical distance satisfies a relationship of:

$$\Delta d = (2m-1)\lambda/8$$

λ: a wavelength of a laser beam transmitted within the compound cavity; and m: a natural number.

7. The optical displacement sensor according to claim 1, wherein the optical distance modulation means comprise wavelength changing means for changing an oscillation wavelength of the semiconductor laser.

8. The optical displacement sensor according to claim 7, wherein the wavelength changing means comprises laser driving means for changing the oscillation wavelength of the semiconductor laser by changing a driving current supplied to the semiconductor laser.

* * * * *